US010993791B2

(12) United States Patent
Kicklighter

(10) Patent No.: US 10,993,791 B2
(45) Date of Patent: May 4, 2021

(54) FLOSS FEEDER

(71) Applicant: Leslie Jordan Kicklighter, Statesboro, GA (US)

(72) Inventor: Leslie Jordan Kicklighter, Statesboro, GA (US)

( * ) Notice: Subject to any disclaimer, the term of this patent is extended or adjusted under 35 U.S.C. 154(b) by 197 days.

(21) Appl. No.: 15/898,339

(22) Filed: Feb. 16, 2018

(65) Prior Publication Data

US 2019/0254793 A1 Aug. 22, 2019

(51) Int. Cl.
*A61C 15/04* (2006.01)

(52) U.S. Cl.
CPC .......... *A61C 15/046* (2013.01); *A61C 15/043* (2013.01)

(58) Field of Classification Search
CPC ....... A61C 15/046; A61C 15/04; A61C 15/02; A61C 15/043; B65H 35/002; B65H 37/005; B65H 49/205; B65H 75/406; A61B 17/0467; A61B 17/0482; A61B 17/06114; A61B 17/06128
USPC ............... 132/324, 323, 321, 329, 322, 325; 242/588, 588.3, 405; 112/35, 49, 68, 112/80.05, 80.4, 281, 222–227; 289/8
See application file for complete search history.

(56) References Cited

U.S. PATENT DOCUMENTS

| 5,050,625 | A | * | 9/1991 | Siekmann | A61C 15/045 132/323 |
| 5,105,840 | A | * | 4/1992 | Giacopuzzi | A61C 15/046 132/325 |
| 5,735,299 | A | * | 4/1998 | Kaltenbach | A61C 15/045 112/224 |
| 5,855,216 | A | * | 1/1999 | Robinson | A61C 15/04 132/322 |
| 6,488,036 | B1 | * | 12/2002 | Francis | A61C 15/043 132/324 |
| 2010/0012146 | A1 | * | 1/2010 | Filsouf | A61C 15/046 132/325 |
| 2015/0305841 | A1 | * | 10/2015 | Hollaway | A61C 15/045 132/323 |

FOREIGN PATENT DOCUMENTS

| GB | 206343 A | * | 11/1923 | ........... A61C 15/046 |
| KR | 20040031566 A | * | 4/2004 | ........... A61C 15/046 |
| WO | WO-2009002025 A1 | * | 12/2008 | ............. A61C 15/04 |

* cited by examiner

*Primary Examiner* — Tatiana L Nobrega
*Assistant Examiner* — Sarah Woodhouse

(57) ABSTRACT

A "Super Floss" and expanding floss carrier which is held in a hand in a similar fashion to the way a toothbrush is held. It has a handle, which can hold extra "Super Floss" and expanding floss and act as a floss dispenser. It is wider in the center of the handle area and becomes narrow toward the ends of the handle. At the end of the floss carrier where it enters a mouth is a funnel, which is wider at the end closest to the handle and narrow toward the tip. The tip is curved so that it can point in between teeth to allow "Super Floss" and expanding floss to be directed between teeth. Fingers are used to direct floss from the dispenser portion of the floss carrier to the funnel portion of the carrier so that the "Super Floss and expanding floss can be then directed into a mouth.

7 Claims, 5 Drawing Sheets

FLOSS FEEDER

RELATED APPLICATIONS

The present application is a continuation-in-part application of U.S. provisional patent application, Ser. No. Application No. 62/451,079, filed Jan. 27, 2017, for FLOSS FEEDER, by Leslie Jordan Kicklighter, included by reference herein and for which benefit of the priority date is hereby claimed.

FIELD OF THE INVENTION

The present invention relates to dental cleaning aids and, more particularly, to dental flossing aids.

BACKGROUND OF THE INVENTION

Ever since people have had teeth, there has been a need to care for the teeth to prevent the teeth from forming cavities and to prevent gum disease around the teeth. For many years, attempts have been made to care for teeth to reduce the possibility of developing cavities in the teeth and to prevent gum disease. During the normal aging process or when numerous dental restorations are present in a mouth, it becomes hard to properly care for teeth due to destruction of bone surrounding teeth and due to contours in dental restorations that are not natural. When bone loss occurs over time around teeth, spaces around teeth become larger and harder to keep clean. When a dental prosthesis is placed in the mouth known as a dental fixed bridge, the flossing surfaces of the teeth involved with the bridge are no longer easily accessible. Dental braces present another obstacle to inhibit easy care of teeth to prevent decay or gum disease. When dental braces are in place, it is very hard to clean teeth thoroughly because the braces form a barrier to prevent proper cleaning of the teeth. Fixed wire retainers placed on most front teeth after dental braces are completed prevent traditional floss from being used to clean between teeth where fixed wire retainers are placed. Arthritis and other decreases in dexterity of the hands can prevent proper cleaning of teeth. Access to the teeth with proper cleaning tools is a major problem due to the inability to place hands into the mouth in a proper position to allow cleaning of the teeth. Small mouth openings and large hands present more of a barrier against properly cleaned teeth.

Toothbrushes, floss, water flossers, and toothpicks have all been used for many years to clean teeth. In recent years, flossers with pre-loaded dental floss, proxabrushes, and interdental picks have been used to clean teeth. "Super Floss" from Oral-B and expanding floss with widened flossing surface area have been used to allow the floss to clean wider spaces most effectively and to clean areas underneath fixed bridges and around braces most effectively. Floss threaders are also used with a needle and thread method to thread floss between teeth. Most recently, floss threaders with thick floss attached to it has been manufactured in an attempt to floss through the areas inaccessible by traditional floss and areas needed to be cleaned by a wider flossing surface.

Prior art tooth cleaning devices do not work adequately when bone loss is present around teeth and around fixed bridges where access is limited. Braces are very hard to clean around with prior art aids. Floss threaders, "Super Floss" and expanding floss are useful in the front of the mouth, but are very hard to utilize with teeth beyond the front teeth due to the inability to get these cleaning aids to the back teeth. Water flossers are messy due to water spray that occurs while using them. Water flossers also do not provide the cleaning efficiency of "Super Floss" and expanding floss, due to the lack of a cloth type surface pulling debris off teeth.

SUMMARY OF THE INVENTION

In accordance with the present invention, there is provided a "Super Floss" and expanding floss carrier which is held in a hand in a similar fashion to the way a toothbrush is held. It has a handle, which can hold extra "Super Floss" and expanding floss and act as a floss dispenser. It is wider in the center of the handle area and becomes narrow toward the ends. At the end of the floss carrier where it enters the mouth is a funnel, which is wider at the end closest to the handle and narrow toward the tip. The tip is curved so that it can point in between teeth to allow "Super Floss" and expanding floss to be directed between teeth. Fingers are used to direct floss from the dispenser portion of the floss carrier to the funnel portion of the carrier so that the "Super Floss" and expanding floss can be then directed into a mouth.

It would be advantageous to provide a flossing aid which allows one to place "Super Floss" and expanding floss between teeth in the back of a mouth.

It would also be advantageous to provide a flossing aid which acts as a "Super Floss" and expanding floss dispenser, preventing a user from having to carry "Super Floss" and expanding floss separately from a flossing aid.

It would further be advantageous to provide a flossing aid which can place "Super Floss" and expanding floss easily in between braces, under fixed wire retainers, and under fixed dental bridges where "Super Floss" and expanding floss is placed at the present time only with extreme difficulty.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the Figures.

DESCRIPTION OF THE PREFERRED EMBODIMENT

Figure 1:
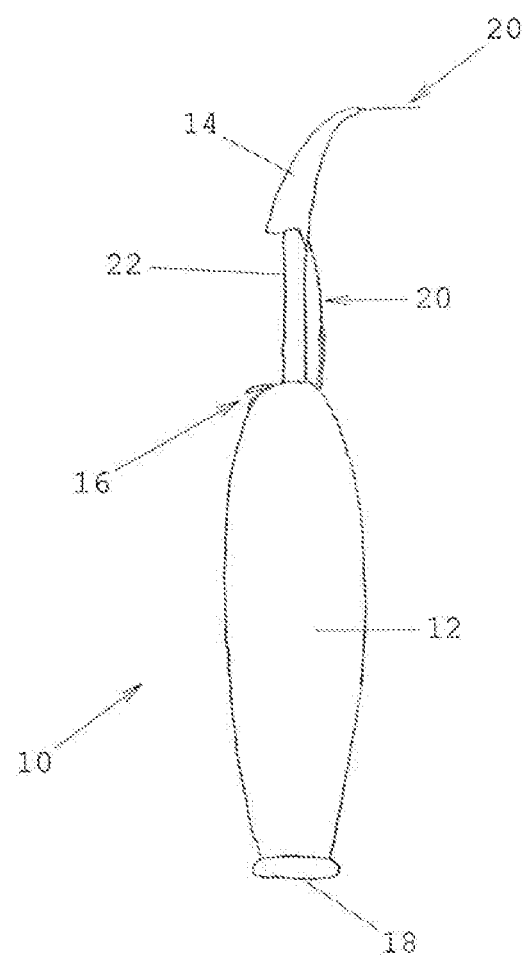
FIG. 1 is a right perspective view of a floss feeder in accordance with the invention.

FIG. 1 is a right perspective view of a floss feeder 10 in accordance with the invention. "Super Floss" 20 manufactured by Oral-B and expanding floss, such as expanding floss manufactured by Butler Gum is stored inside a dispenser handle 12 of a floss feeder 10. "Super Floss" 20 and expanding floss are threaded into a funnel 14 portion of a floss feeder 10. A funnel 14 will direct floss in between teeth, under dental bridge work, under fixed orthodontic retainer wire, and under orthodontic braces wire. A floss cutter 16 will allow floss to be cut between one length of "Super Floss" 20 or expanding floss and another length of "Super Floss" 20 or expanding floss. A screw-on base 18 secures a dispenser handle onto a floss feeder 10. A screw-on base 18 also can be removed to allow a new dispenser handle 12 to be placed onto a floss feeder 10 once all "Super Floss" 20 or expanding floss is used from an existing dispenser handle 12. A shaft 22 is connected to a funnel 14 part of a floss feeder 10 to hold it in place. A shaft 22 can also change shape and become a funnel 14 portion of a floss feeder 10. A funnel 14 portion of a floss feeder 10 is the working end of a floss feeder 10. At the other end of a floss feeder 10 shaft 22 is a portion that allows it to fasten into a screw-on base 18, holding a dispenser handle 12 in place.

Figure 2:
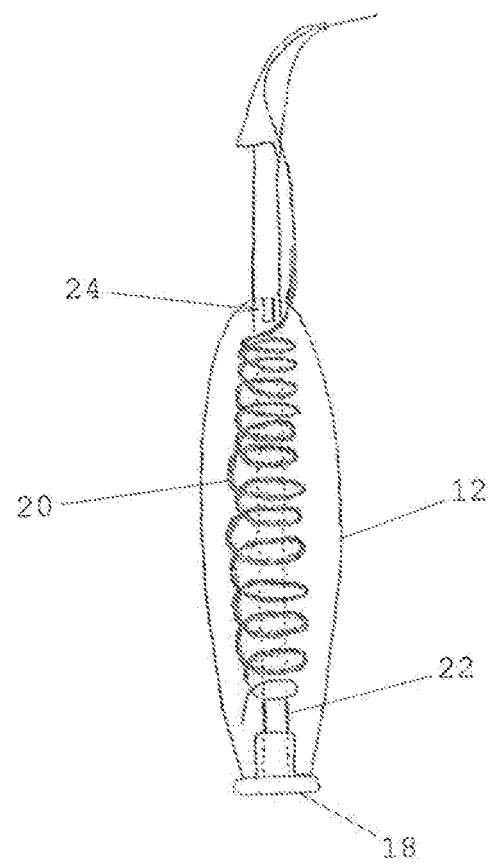
FIG. 2 is a right sectional view of a floss feeder shown in FIG. 1. this figure is a cross section of the floss feeder.

FIG. 2 is a right sectional view of a floss feeder 10 shown in FIG. 1. This figure is a cross section of a floss feeder 10. A hollow chamber in a funnel 14 allows "Super Floss" 20 and expanding floss to be inserted and directed into the correct position inside a mouth. A chamber in a dispenser handle 12 is visible, showing a storage area for a reel of "Super Floss" 20 and expanding floss. A manufacturer of a floss feeder 10 would ideally place a first length of "Super Floss or expanding floss into a correct position of use by feeding a first length of "Super Floss" 20 or expanding floss through a port of a dispenser handle 12 and through an entire length of a funnel 14 portion of a floss feeder 10 until it exits a funnel 14 by it's pointed tip. FIG. 2 and other figures of a floss feeder 10 illustrate a correct starting position for a floss feeder 10. A shaft key 24 fixed onto a shaft 22 allows a dispenser handle 12 to be placed onto a shaft 22 without it spinning around a shaft 22. A shaft 22 could be a cylinder design in this case. A shaft 22 could also have sides or be ovoid in nature, which would allow it to function without needing a shaft key 24. A portion of a shaft 22 toward the working end of a floss feeder 10 where a shaft key 24 is shown would need to have a stop on a shaft 22 to prevent a dispenser handle 12 from sliding up and down a shaft 22. A dispenser handle 12 could also have a stop designed into it to allow it to stop once it engages a shaft key 24. A screw-on base 18 is shown to go inside a dispenser handle 12 and screw onto a shaft 22 to keep a dispenser handle 12 secure.

Figure 3:
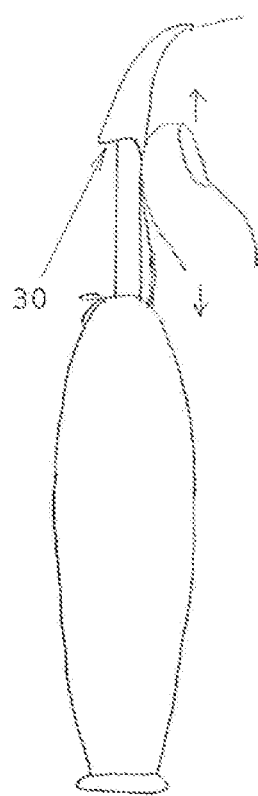
FIG. 3 is a left working view of a floss feeder shown in FIG. 1 with a thumb moving floss in and out of the floss feeder.

FIG. 3 is a left working view of a floss feeder 10 shown in FIG. 1 with a thumb moving "Super Floss" 20 or expanding floss in and out of a floss feeder 10. A finger or thumb can be used to move floss in and out of a floss feeder 10 when a finger or thumb engages "Super Floss" 20 or expanding floss directly at its entry point into a funnel 14. Directed pressure from a finger or thumb against a length of "Super Floss" 20 or expanding floss forces "Super Floss" 20 or expanding floss in and out of a floss feeder 10. A funnel 14 portion of a floss feeder 10 also has a flush out hole 30 on a side opposite to the "Super Floss" 20 or expanding floss entry point into a funnel 14. A flush out hole 30 allows a funnel 14 to be cleaned of plaque and debris as needed. Water and cleaning fluid can be flushed through a funnel 14 from the shaft 22 side of a funnel 14 to clean out debris.

Figure 4:
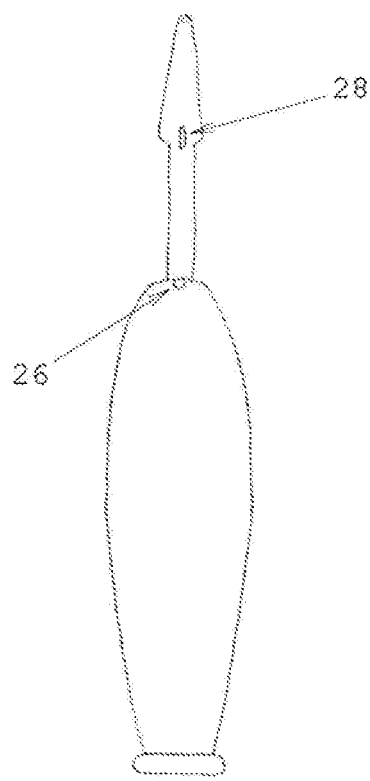
FIG. 4 is a front perspective view of a floss feeder shown in FIG. 1.

FIG. 4 is a front perspective view of a floss feeder 10 shown in FIG. 1. A dispenser floss hole 26 is an exit port for "Super Floss" 20 and expanding floss from a dispenser handle 12. A funnel floss slot 28 is an entry point for "Super Floss" 20 and expanding floss to enter a funnel 14, which will allow "Super Floss" 20 and expanding floss to be directed into an appropriate location inside a mouth. A slot is present in this location to allow a finger or thumb more contact time with "Super Floss" 20 and expanding floss to direct "Super Floss" 20 and expanding floss toward and away from teeth.

Figure 5:
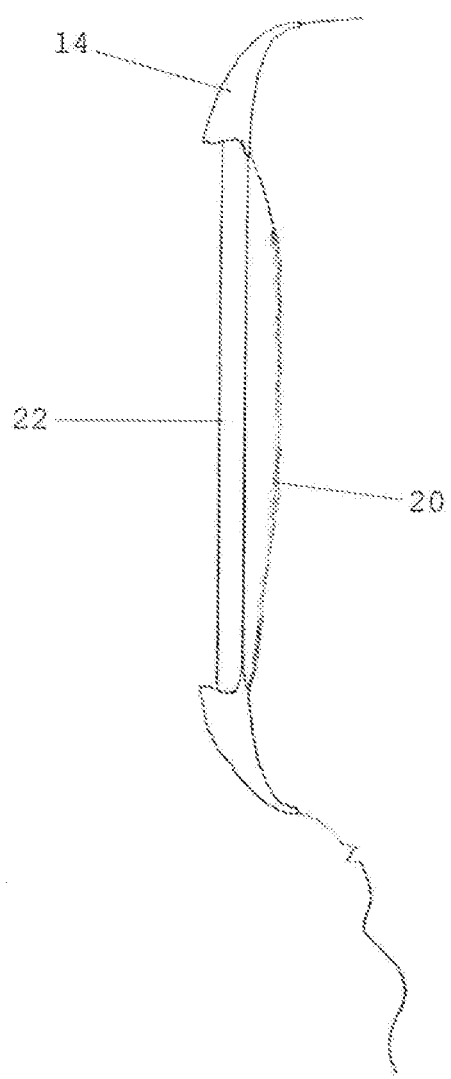
FIG. 5 is an alternative design right perspective view of a floss feeder. this figure shows a floss feeder design with no floss dispenser.

FIG. 5 is an alternate design right perspective view of a floss feeder 10. A floss feeder 10 can be manufactured with no storage area and no dispenser handle 12 for "Super Floss" 20 and expanding floss. A floss feeder 10 can be designed in such a was as to have one or more funnels. A funnel 14 can also be designed to have multiple angulations at its pointed tip to allow better access into a mouth and better access around dental appliances and prostheses.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A floss feeder for placing dental floss between teeth, under dental bridgework, under dental implant bridgework, and under orthodontic appliances, the floss feeder comprising:

a hollow dispenser handler having a longitudinal axis extending between a proximal end and a distal end thereof;

a screw-on base positioned at the proximal end of the dispenser handle, a portion of the screw-on base extends into the interior of the proximal end of the hollow dispenser handle;

a floss cutter positioned on an exterior surface of the dispenser handle, for cutting one piece of floss from another piece of floss at a desired length;

a substantially rigid shaft having a proximal end, a distal end and a substantially constant cross-section between the proximal and distal ends, the proximal end of the shaft being coupled to the proximal end of the handle such that the shaft extends through the hollow interior of the dispenser handle along an entire length thereof and protrudes from the distal end of the dispenser handle, and the distal end of the shaft is connected to a proximal end of the curved funnel;

a curved funnel having a curved pointed tip at a distal end thereof for directing floss in between teeth, under an orthodontic wire, under dental bridge work and under fixed retainers;

a substantially rigid shaft having a proximal end, a distal end and a substantially constant cross-section between the proximal and distal ends, the proximal end of the shaft is screwed onto the screw-on base such that the shaft extends through the hollow interior of the dispenser handle along an entire length thereof and protrudes from the distal end of the dispenser handle, and the distal end of the shaft is connected to a proximal end of the curved funnel;

a shaft key positioned on the shaft proximate the distal end of the dispenser handle and configured to prevent relative rotation between the shaft and the dispenser handle;

an exit port located at the distal end of the dispenser handle for allowing floss to exit the dispenser handle;

a slot positioned at a proximal end of the funnel for allowing floss to enter the funnel and to be moved in and out of the funnel;

an outlet positioned at a distal end of the curved funnel for allowing floss to exit the funnel;

a flush out hole positioned on a side of the funnel opposite the exit port and slot for allowing fluid into the funnel to flush out debris;

a length of floss stored within the hollow dispenser handle about an exterior surface of the shaft;

wherein during use, a segment of the length of floss exits the dispenser handle via the exit port, extends adjacent an exterior surface of the portion of the shaft that protrudes from the dispenser handle, enters the slot of the funnel and exits through the outlet; and wherein the length of floss moves freely between the dispenser handle, exit port, slot and outlet such that when a user positions the curved pointed tip of the funnel into an area to be flossed then places a thumb or finger over the length of floss extending adjacent the exterior surface of the portion of the shaft that protrudes from the dispenser handle, and applies a distally directed force thereto, the length of floss freely advances out of the funnel via the outlet and is thereby placed into the area to be flossed.

2. The floss feeder in accordance with claim 1, wherein the dispenser handle has a mid-section positioned between the proximal end and the distal end, wherein the dispenser handle has a larger cross-section at the mid-section for accommodating arthritic patients who cannot grasp narrow handles.

3. The floss feeder in accordance with claim 1, wherein the funnel is wider at the proximal end thereof, and narrows toward the distal end, wherein the distal end terminates in the curved pointed tip so that the floss can exit the funnel without collapsing or binding in a user's gingival tissues.

4. The floss feeder in accordance with claim 1, wherein the screw-on base comprises a circular flange that protrudes from the proximal end of the dispenser handle and keeps the dispenser handle in place.

5. The floss feeder in accordance with claim 1, wherein the shaft is cylindrical in shape and has screw threads at its proximal end to engage with the screw-on base, the shaft key is located proximate the distal end of the dispenser handle and engages the dispenser handle to prevent axial movement of the dispenser handle in to distal direction.

6. The floss feeder in accordance with claim 1, wherein the slot is elongated.

7. The floss feeder in accordance with claim 1, wherein the flush out hole comprises a flared entrance pointed away from the distal end of the funnel, and is configured to allow water cleaning solution to reach inside the funnel to clean out debris therefrom.

\* \* \* \* \*